INVENTOR.
DELMAR J. MANCHESTER
BY
Attorney

INVENTOR.
DELMAR J. MANCHESTER

INVENTOR.
DELMAR J. MANCHESTER

INVENTOR.
DELMAR J. MANCHESTER

United States Patent Office 2,762,946
Patented Sept. 11, 1956

2,762,946

AUTOMATIC HYDRAULIC SERVO FEED FOR ELECTRIC ARC METAL WORKING MACHINES

Delmar J. Manchester, Clinton, Mich., assignor, by mesne assignments, to Elox Corporation of Michigan, Clawson, Mich., a corporation of Michigan Application November 5, 1954, Serial No. 467,199

3 Claims. (Cl. 314—61)

My invention relates to an automatic hydraulic servo feed for electric arc metal working machines in which the work on the metal is affected by the employment of an electric arc. In this type of machine, the workpiece is connected to one end of a welding circuit and an electrode, connected to the other end of the welding circuit, is intermittently brought into contact and drawn out of contact with the workpiece so that intermittently an electric spark is struck. As the work proceeds, the electrode must be advanced toward the workpiece.

A common practice has been to mount the electrode bearing head, which contains the reciprocating mechanism, on a drill press or the like and advance the electrode toward the workpiece by hand feeding the same. This manual feeding of the electrode requires a certain amount of skill and careful attention due to the tendency of small electrodes to bend, overheat, or wander off a straight line when too much feed is applied. The larger electrodes have a tendency under certain conditions of manual feeding to draw too much amperage and as a result weld themselves to the workpiece.

With some types of metal the electric arc will act much slower than with other types of metal so that where manual feeding is resorted to, the operator must also know the type of metal being worked upon and understand the speed of cutting or disintegrating effected on the workpiece by the electric arc. Since this operation upon metal is usually in the nature of a cutting operation, it may be referred to as a "cutting" action, and the current referred to as a "cutting" current.

It is an object of the present invention to provide an automatic feed so as to remove as much as possible the "human" element and provide an automatic feed whereby the degree of feeding will be proportioned to the work performed upon the workpiece.

The present invention has as a further object the provision of an automatic feed which provides an automatic error correction system in which the electrode is fed at a rate such as to maintain a constant predetermined amperage flow through the disintegrating or metal working circuit.

Another object of the invention is the provision of a fluid operated mechanism having a control valve operated in direct ratio to the amount of current being used for operating upon the metal.

Other objects will appear as the description proceeds.

It is recognized that various modifications and changes could be made in the detail of structure illustrated, and the present disclosure is to be considered a description of but one embodiment of the invention.

Forming a part of this application are drawings in which.

Figure 2:
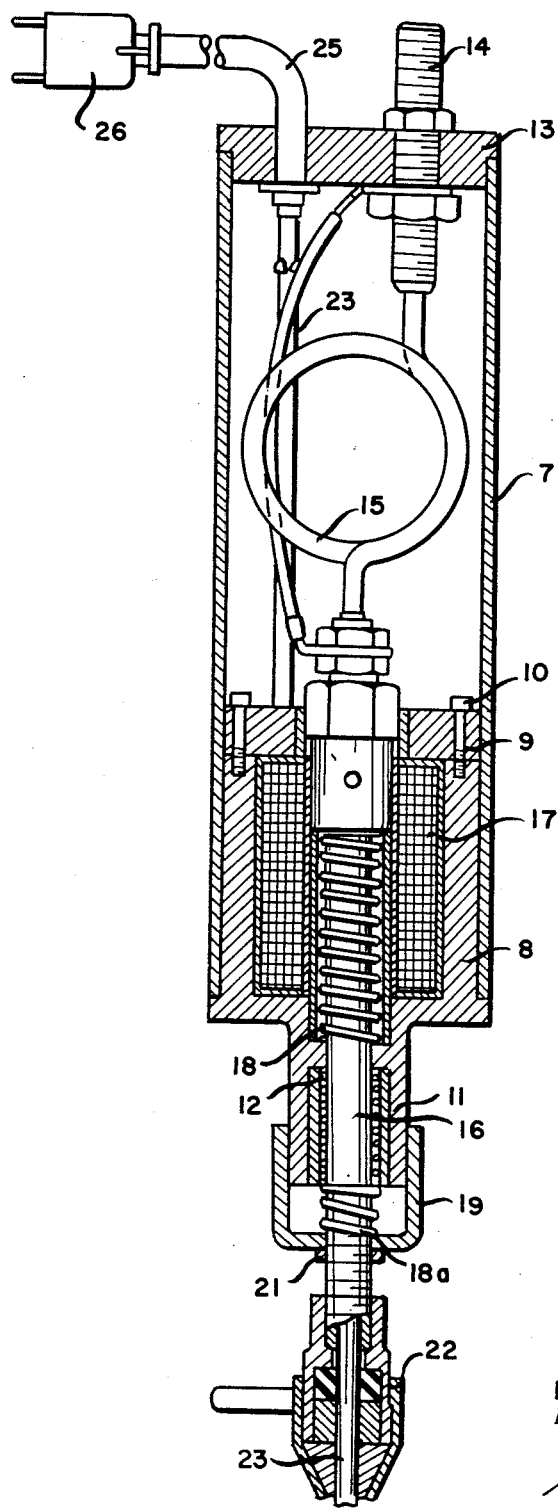
Fig. 2 is a longitudinal central sectional view through one type of head containing the reciprocating mechanism for reciprocating the electrode.

In Fig. 2, I have shown a typical head used on electro-arc metal working machines. As shown in the drawings, the head comprises a casing 7 having at its lower end an inserted cup-shaped member 8 secured to a metallic wall 9 by the bolts 10 and having a neck 11 projecting outwardly from the casing 7. Formed in this neck is an internal flange 12. A top 13 is secured to the casing 7 and extending through the top 13 is a tubular terminal 14 having the coil 15 formed thereon within the casing 7 and secured at its upper end to a spindle 16. This spindle 16 extends through an electro-magnet 17.

A spring 18 engages at one end against the flange 12 and at the other end against the enlarged portion of the spindle 16 so as to normally retain the spindle moved upwardly. When the electro-magnet is energized the spindle will move downwardly against the compression of the spring 18.

Mounted on the lower end of the neck 11 is a cup 19 retained in position by a nut 21 threaded on the spindle 16. A spring 18a is positioned within the cup 19 and serves to retain the same spaced downwardly from the lower end of the neck 11. A chuck 22 is mounted on the lower end of the spindle 16 and serves to retain the hollow electrode 23. A cable 25 extends into the housing and serves as a means for conducting current to the winding of the electromagnet, this cable being provided with a socket plug 26 so that it may be plugged into a suitable source of electrical energy.

In operation, as the electrode is reciprocated against the work, the spark will be struck and a part of the workpiece will be removed so that it becomes necessary to move the head or housing 7 toward the work as the working operation is carried on.

The structure shown in Fig. 2 does not form a part of the present invention but is presented for illustration purposes only. The invention relates to a means for feeding the casing 7 downwardly toward the work as required.

Figure 1:
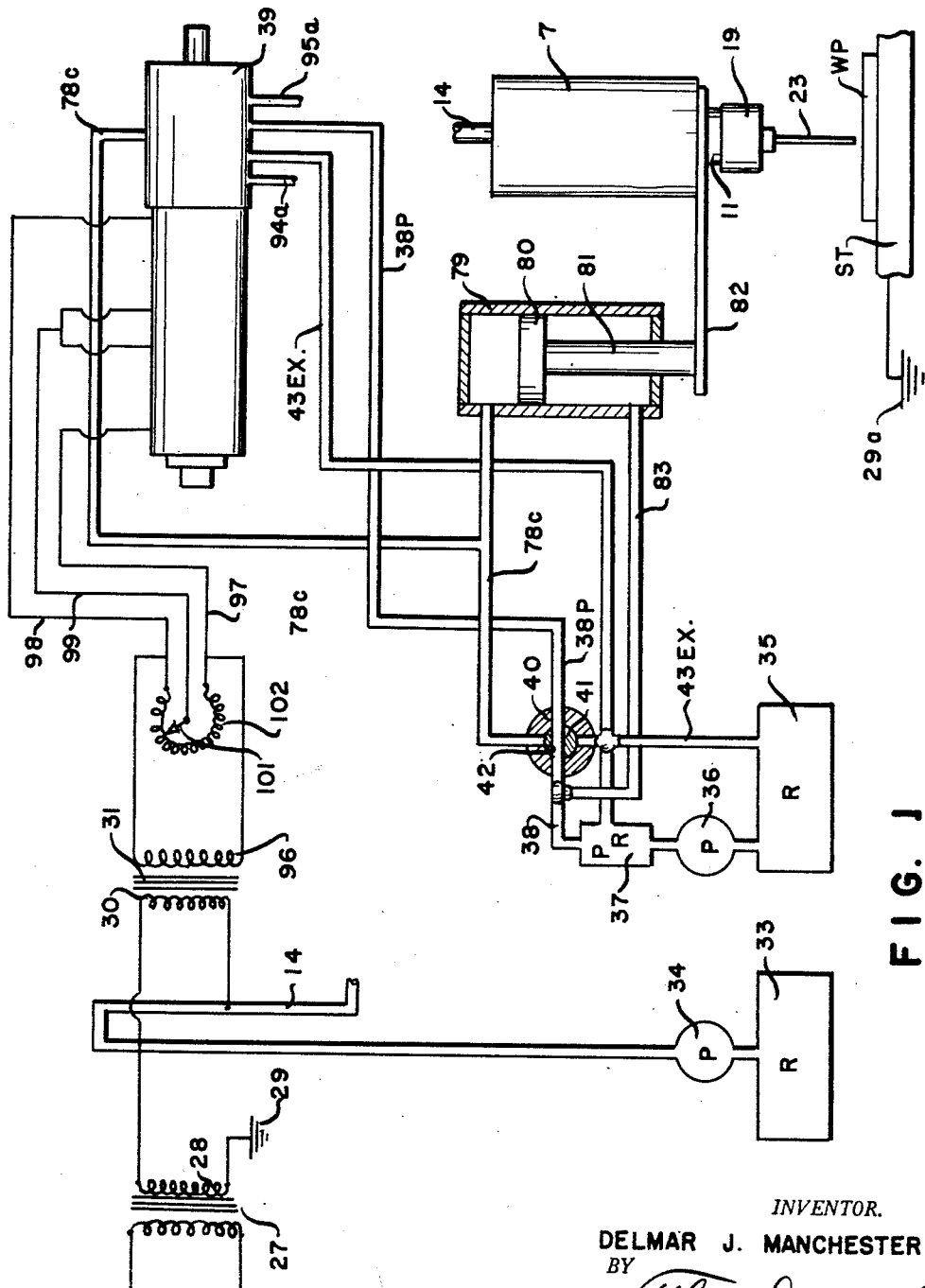
Fig. 1 is a schematic view illustrating the hydraulic or pneumatic circuit and the wiring diagram.

As shown in Fig. 1, a welding circuit is used embodying the transformer 27 having the secondary winding 28 grounded as at 29. This secondary winding is also connected to the metallic member 14 so that the electrode 23 is thus connected in the welding circuit.

A second transformer 31 embodying the primary winding 30 is placed in series with the secondary winding 28 which supplies the cutting current. This transformer 31 is a small transformer used to transmit voltage to a solenoid valve, to be described, through a voltage divider in direct ratio to the amount of cutting current flowing through the secondary of the main disintegrator transformer 27.

A reservoir or sump 33 for liquid is provided connected with which is a pump 34 used for directing a coolant liquid through the member 14. This coolant liquid flows through the tubular electrode 23 so that as the arc is struck and the metal is disintegrated or cinderized on the workpiece, the coolant has a fractionating effect.

A reservoir or sump 35 is connected with a pump 36 for forcing liquid through the line 38 in which is interposed a pressure regulator 37. This line 38 leads through 38P to one end of a valve housing 39. The fluid is delivered through the line 38 through the valve embodying the housing 40 and the rotatable and longitudinally movable spool 41 having a passage 42 formed therein. This valve is manually operated and in Fig. 1 a spool is shown turned so that the passage 42 will permit delivery of fluid through the line 38P. Return fluid from the valve 39 flows through the exhaust pipe 43EX into the sump 35.

Figure 3:
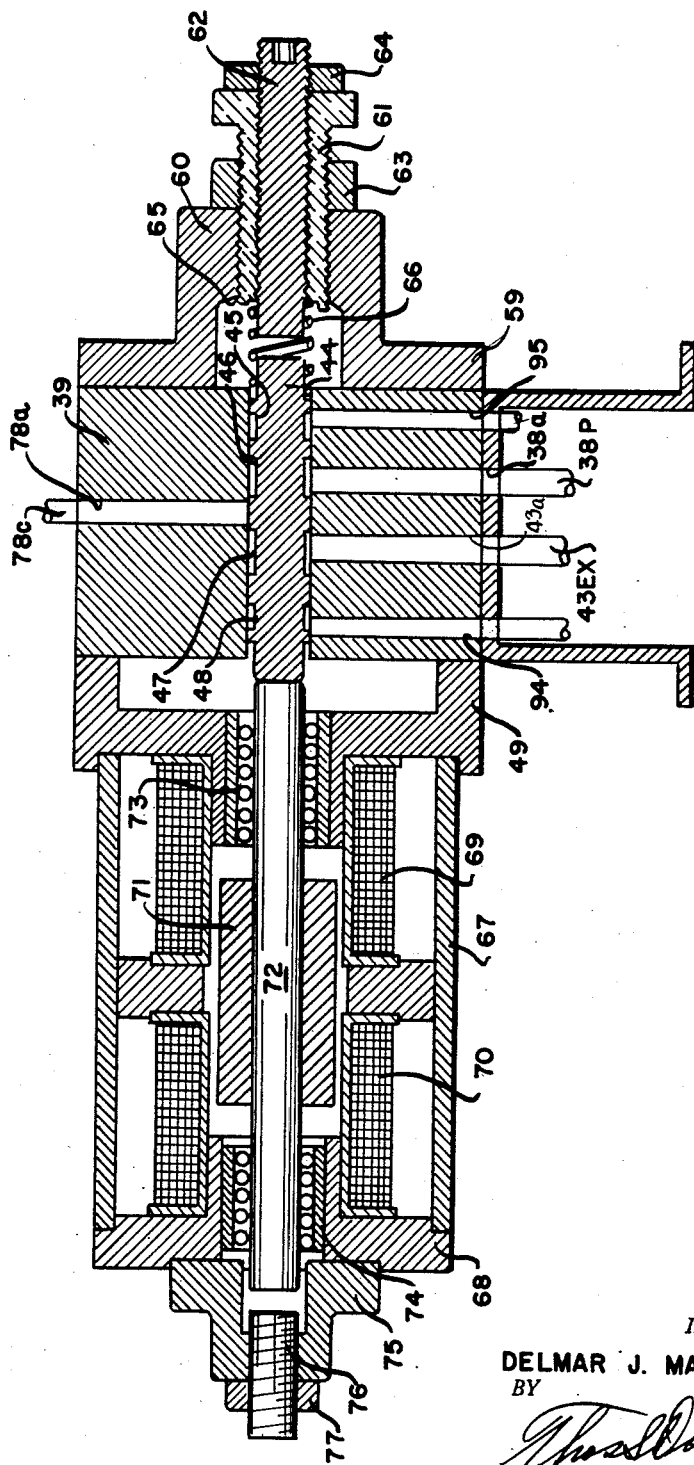
Fig. 3 is a longitudinal central sectional view through the solenoid operated control valve.
Figure 4:
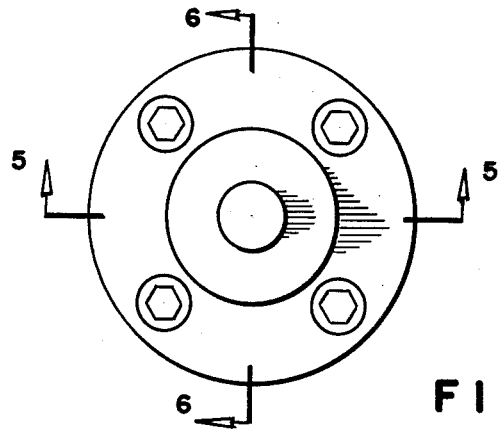
Fig. 4 is an end elevational view of a manually operated control valve.

In the valve housing 39 is positioned a longitudinal slidable spool 44 having the peripheral grooves 45, 46, 47 and 48 formed therein. This housing 39 is closed on one side with a cap 49 and on the opposite side with a cap 59. Projecting outwardly from the cap 59 is a central hub 60 in which is threaded a fitting 61. Threaded into this fitting 61 is an adjusting screw 62, the fitting 61 being provided with a lock-nut 63 and the screw 62 being provided with a lock-nut 64, as shown in Fig. 3. The hub 60 is provided with a chamber 65 and positioned in this chamber and engaging at one end the end of the fitting 61 is a spring 66, the other end of which engages a shoulder on the slidable spool 44 normally tending to retain the spool 44 pushed to the left of Fig. 3.

Mounted on the cap 49 is a housing 67 having an end cap 68 and positioned in this housing 67 are the solenoids 69 and 70 which are spaced apart and each of which has a common armature or core 71 fixedly mounted to which is the thrust rod 72 sliding in the bearings 73 and 74.

Mounted on the cap 68 is a housing 75 into which the rod 72 projects at one end. Projecting into the housing 75 from one end is an adjusting screw 76 provided with a lock-nut 77 so that the distance of movement of the rod 72 to the left of Fig. 3 may be adjusted.

As shown in Fig. 1, I provide a work cylinder 79 in which is mounted a piston 80 having a piston rod 81 connected to the rigid plate 82 which is fixedly mounted to the housing 7 so that upon raising and lowering of the piston 80 the housing 7 may be raised and lowered as the cutting operation proceeds. It is of course desirable to lower the housing 7 relative to the workpiece WP which is mounted on the supporting table ST which is grounded as at 29a. When the workpiece is grounded in this manner, the work table would have to be metallic and thus the workpiece would be connected in the welding circuit 27.

A conduit 83 serves to communicate the line 38 with the bottom of the cylinder 79 and conduit 78c communicates with the upper end of the cylinder 79. This conduit 78c also communicates with a passage 78a formed in the housing 39 of the solenoid operated valve, as shown in Fig. 3.

As shown in Fig. 1, the conduit 78c is not in communication with the pressure line 38P, this pressure line 38P communicating with the passage 38a formed in the housing 39 of the solenoid operated valve. This line 38P may be considered the pressure line, and as shown in Fig. 3, upon a shifting of the spool 44 to the left, the passage 38a may be brought into communication with the passage 78a so that liquid under pressure may be delivered through the line 78c to the upper end of the cylinder 79. This shifting of the spool 44 to the left of Fig. 3 can only be effected upon movement of the rod 72 to the left of Fig. 3 which is effected upon the energizing of one of the solenoid coils 69 or 70.

The lower end of the cylinder 79, as shown in Fig. 1, is connected by the conduit 83 to the pressure line 38 so that liquid under pressure is always delivered to the lower end of the cylinder 79. When the line 78c is connected through the solenoid operated valve to the pressure line 38P, liquid will then be delivered to the upper end of the cylinder 79 and the piston 80 will be forced downwardly due to the greater area exposed to the liquid under pressure. It is, of course, understood that the cylinder 79 is mounted on a fixed support and is stationary.

The plug 41 in the valve housing 40 may be manually rotated and when rotated to the position shown in Fig. 1, this valve is in the normal operating position. Should this valve 41 be rotated 90° the passage 42 would establish communication between the upper end of the cylinder 79 and the conduit 43EX, thus allowing the upper end of the cylinder 79 to exhaust to the sump and permitting the upward movement of the piston 80 with its connected parts. When in this position, no fluid would be flowed at all except in the lower end of the cylinder 79.

Figure 5:
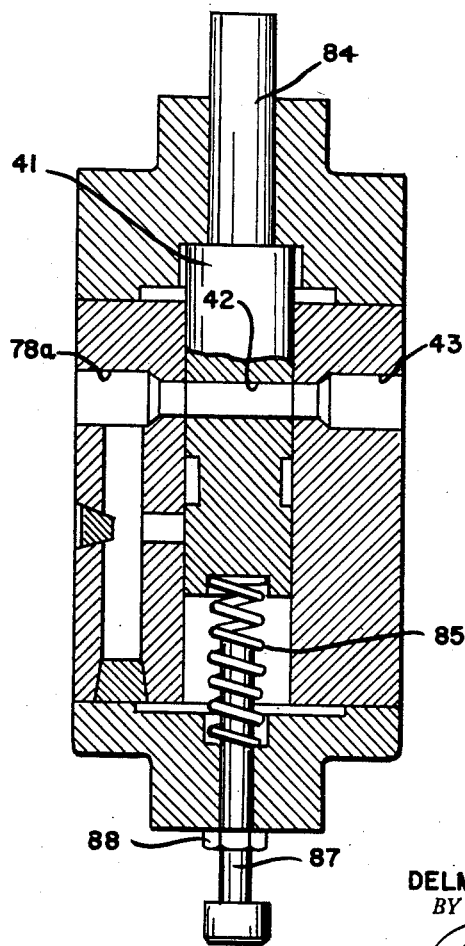
Fig. 5 is a sectional view taken on line 5—5 of Fig. 4.
Figure 7:
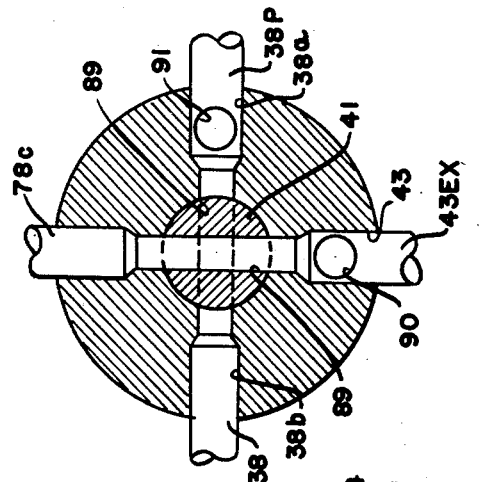
Fig. 7 is a sectional view taken on line 7—7 of Fig. 6.
Figure 8:
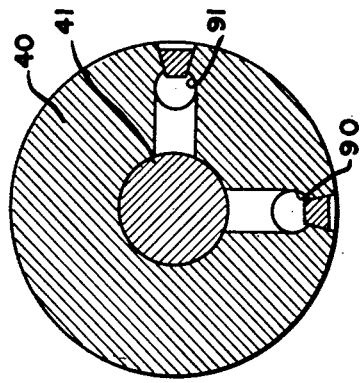
Fig. 8 is a sectional view taken on line 8—8 of Fig. 6.
Figure 6:
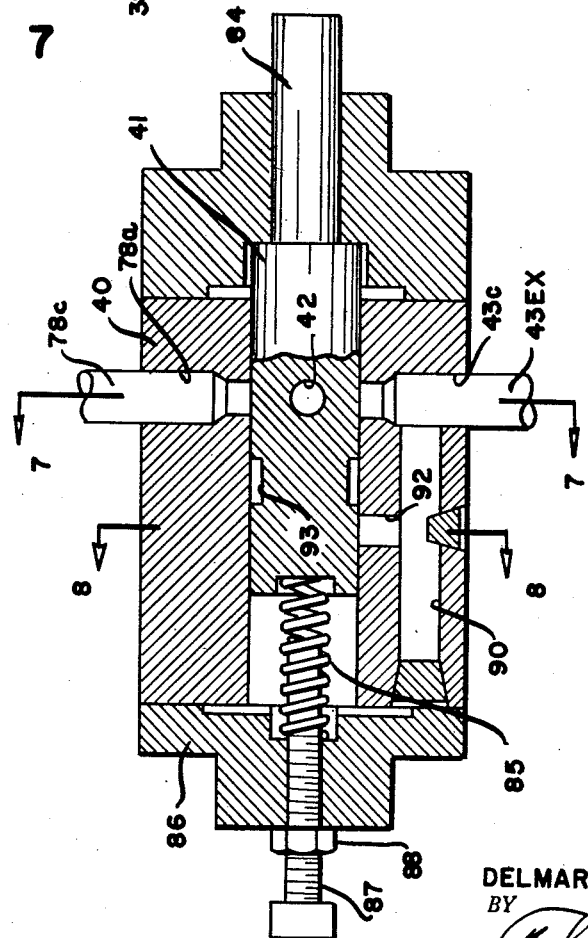
Fig. 6 is a sectional view taken on line 6—6 of Fig. 4.

As shown in Fig. 5 and Fig. 6, this valve plug 41 is mounted in the housing 40 in such a manner that it is longitudinally movable as well as rotatable, the spring 85 normally retaining the plug moved to the position shown in Fig. 5 and Fig. 6. This spring 85 embraces the adjusting screw 87 which projects through the end cap 86 and which is provided with a nut 88. In Fig. 5, the valve plug 41 is rotated 90° from that position shown in Fig. 1, and in Fig. 6, the valve plug is shown rotated to the position shown in Fig. 1.

When operating normally, it is sometimes desirable to have the fluid flowing directly to the upper side of the cylinder 79 without going through the solenoid operated valve thus giving a rapid downward motion so as to enable the machine operator to engage the electrode with the workpiece more rapidly. This is accomplished by moving the spool 41 longitudinally against the compression of the spring 85 whereupon through the passages 90, 92 and groove 93 and suitable outlet ports, fluid may be delivered directly to the upper end of the cylinder 79. Upon releasing this pressure on the spool, the spring will return the plug 41 to its normal position and the feed of the electrode thus slows up since the fluid would then pass through the solenoid operated valve and the automatic mechanism would be set into operation.

Formed in the valve housing 39, as shown in Fig. 3, are passages 94 and 95 communicating with which are the conduits 94a and 95a respectively, leading to the sump. These passages are used merely to conduct to the sump any oil leakage which might take place around the spool 44.

The secondary winding 96 of the transformer 31 is connected at one end by the wire 97 to the solenoid 70; it is also connected by the wire 98 to the solenoid 69 and the wire 99 serves to connect to both solenoids from a pointer 101 of voltage divider 102.

When it is desired to start the operation of the machine, the current would, of course, be turned on and the workpiece would be grounded as described and the electrode 23 would be connected to the other end of the secondary winding of the transformer 27. However, no current would be flowing until the electrode 23 contacts the workpiece WP. The spool in the solenoid valve would be spring-moved to such a position that the groove 46 would be in communication with the passages 38a and 78a, thus allowing liquid to flow into the top of the cylinder 79. This, of course, would move the piston 80 downwardly so that the electrode would approach and finally contact the workpiece WP. As soon as this happens, the current would flow and the current flowing to the solenoid 69 would be greater than the current flowing to the solenoid 70, this being controlled by the powerstat or current divider 102. This would cause the armature 71 to move to the right of Fig. 3 so as to control the port openings and decrease the flow of liquid to the upper side of cylinder 79 thereby slowing the electrode travel so as to draw less amperage.

In actual practice the electrode will continue to slow down until the voltage applied to the solenoid 69 permits the spring 66 to effect an opening of the port to the upper portion of the cylinder enough to maintain the feed rate maintaining a constant cutting current. Of course, the cutting feed may be completely stopped and returned upwardly at any predetermined cutting current value by adjusting the voltage divider to apply such voltage to the solenoid that the armature will move to the right of Fig. 3 to close the port to the upper end of the cylinder 79 and establish connection through groove 47 between the passages 78a and 43a permitting the fluid to return to the sump.

Should the feed be too fast, the electrode would raise and the current flowing to the solenoid would also be increased. This would effect an automatic decrease of the feed which would result in a lowering of the amperage at the electrode 23. Consequently, if the feed is proportioned to the proper cutting speed of the electrode, a constant amperage will be maintained at the electrode and the speed of feeding should be proportioned so that the electrode will advance as the effectiveness of the work is carried on.

Consequently, it is seen that the feeding of the electrode is hydraulically operated and electrically controlled in proportion to the amperage at the electrode. The solenoid 70 is energized by the remainder of the voltage applied from transformer 31 and which is not used by the solenoid 69. The amount of current applied to each solenoid, of course, can be controlled by the voltage divider. This second solenoid 70 magnetizes the armature 71 in such a direction as to counter-balance the solenoid 69 and thus there is provided a finely controllable movement of the armature with the high voltage transmitted from the transformer 31 to the solenoid 69.

What I claim is:

1. In an apparatus for eroding a conductive workpiece by means of intermittent electrical discharge from an electrode, means mounting the electrode for advancing and retracting movement relatively to the workpiece, hydraulic means for controlling movement of the electrode, a valve for controlling said hydraulic means, a solenoid for operating said valve, means operatively associated with said solenoid for causing selective operation thereof in response to current flow through said electrode, and a second solenoid operably associated with the first solenoid for counterbalancing the same.

2. In an apparatus for eroding a conductive workpiece by means of intermittent electrical discharge from an electrode, means mounting the electrode for advancing and retracting movement relatively to the workpiece, hydraulic means for controlling movement of the electrode, a valve for controlling said hydraulic means, a solenoid for operating said valve, means operatively associated with said solenoid for causing selective operation thereof in response to current flow through said electrode, a second solenoid operably associated with the first solenoid for counterbalancing the same, and manually operable means for controlling advancing movement of the electrode independently of said solenoid.

3. In a metal working machine for performing operations upon a metal workpiece by means of an intermittent electric arc, in which the workpiece is connected to one end of a welding circuit and in which there is established between the workpiece and the electrode an electric arc: an electrode for contacting the workpiece and establishing a flow of current through the welding circuit upon contact of the electrode with the workpiece; a carrying member for said electrode; hydraulic means for moving said carrying member toward and away from the workpiece for establishing the relative position of the electrode and said workpiece; a valve for controlling said hydraulic means, and a solenoid for operating said valve; means for controlling the operation of said solenoid in proportion to the current flowing through the electrode; and a second solenoid for counter-balancing said first solenoid.

References Cited in the file of this patent

UNITED STATES PATENTS

| 1,895,699 | Ziska | Jan. 31, 1933 |
| 2,094,867 | Baker | Oct. 5, 1937 |
| 2,440,380 | Payne | Apr. 27, 1948 |